United States Patent

[11] 3,624,045

[72] Inventor Edward C. Stivers
    Atherton, Calif.
[21] Appl. No. 502,623
[22] Filed Oct. 22, 1965
[45] Patented Nov. 30, 1971
[73] Assignee Raychem Corporation
    Redwood City, Calif.

[54] CROSSLINKED HEAT RECOVERABLE THERMOPLASTIC POLYURETHANES
5 Claims, No Drawings

[52] U.S. Cl. .................................................. 260/77.5,
    204/159.19, 204/159.2, 260/75
[51] Int. Cl. .......................................................... C08g 22/04,
    C08g 53/20, B01j 1/10
[50] Field of Search .......................................... 260/75 T,
    75 NP, 77.5 AB, 75 NQ, 75 TN, 77.5 A, 75 NA,
    77.5 AX; 204/159.19, 159.2

[56] References Cited
        UNITED STATES PATENTS
2,806,835   9/1957   Nischk et al. ............ 260/45.4
2,999,851   9/1961   Elmer ...................... 260/75
3,036,042   5/1962   Schmidt et al. ........... 260/75
3,056,171   10/1962  Fite ......................... 18/59
3,061,530   10/1962  Gonsalves ................ 204/154
3,098,832   7/1963   Pooley et al. ............. 260/2.5
3,250,840   5/1966   Procopis ................... 264/175
        FOREIGN PATENTS
820,004     9/1959   Great Britain ............. 260/77.5 AB UX
        OTHER REFERENCES Gruber and Keplinger: Ind. & Eng. Chem., Vol. 51, No. 2, February 1959
Harrington: Rubber Age, Vol. 82, No. 3, Dec. 1957
Saunders and Frisch: Polyurethanes, Part II, pages 377– 384 (Interscience, New York) 1964 Call No. TP986P6S3

Primary Examiner—Donald E. Czaja
Assistant Examiner—H. S. Cockeram
Attorney—Lyon & Lyon ABSTRACT: This disclosure describes a class of thermoplastic polyurethane rubbers having heat-activated dimensional memory characteristics. Cross-linking of thermoplastic urethanes is carried out both by chemical means and by high-energy radiation.

CROSSLINKED HEAT RECOVERABLE THERMOPLASTIC POLYURETHANES

This invention relates to a novel class of heat-recoverable cross-linked polyurethane rubbers having heat-activated dimensional memory characteristics.

Polyurethane elastomers or rubbers are known materials for use in conveyor belts, tubing, and the like. These known polyurethane rubbers are cross-linked and are comparable in many ways to vulcanized natural rubber and possess the physical property of elastic extensibility. Hence, such polyurethane rubbers will stretch an amount directly proportional to the applied force and will recover upon the removal of the force. Thus, when the force is removed, the polyurethane rubber returns to its original cross-linked size and shape.

More recently there has been marketed a class of uncross-linked thermoplastic polyurethane rubbers which behave at ordinary, e.g., room temperature as if they are cross-linked, but which behave as a thermoplastic, i.e., melt and flow, at elevated temperatures. Typical of such thermoplastic polyurethane rubbers is one having the following structural formula: These polymers are sold under the trade name Estane.

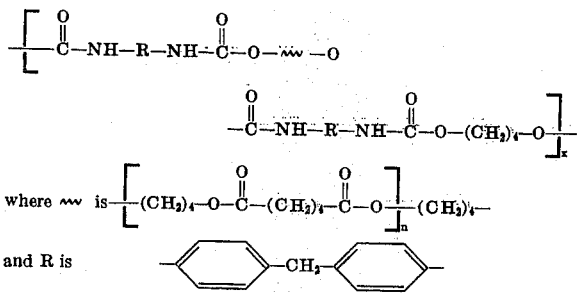

Another class of such thermoplastic polyurethane rubber is called "Texin" These isocyanate-terminated polymers are somewhat higher in molecular weight than "Estane" the polymer shown above. The class of polymer sold are prepared from hydroxyl-terminated polyesters, methylene-p-phenylene diisocyanate, and a diol resulting in solid, thermoplastic products.

The classical rubberlike behavior of these uncross-linked polymers at moderate temperatures can probably be ascribed to interchain hydrogen bonding which behave as secondary cross-links, e.g:

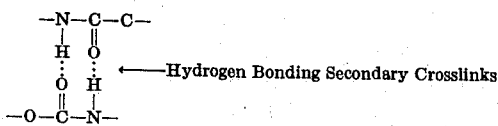

Polyurethanes of this type are well known and are described in High Polymers, Vol. XVI, Saunders and Frisch, Polyurethanes: Chemistry and Technology, II. Technology, Part II, Interscience Publishers, Div. of John Wiley & Sons, New York (1964).

Dimensionally heat-unstable or heat-recoverable thermoplastic polyurethane articles of little utility may be produced by imparting a considerable amount of force or stress to the heated material after initial fabrication, followed by a cold temperature quench to hold the molecules in the stressed, usually elongated condition. Subsequently, upon carefully heating, the fabricated product will tend to recover or reform to the original configuration. However, these polyurethanes have essentially no strength at elevated temperatures and thus can be readily deformed to an undesired shape or form. Generally, the hydrogen bonds in these materials disappear with increasing temperature in a manner which may be estimated by the Arrhenius equation $$v_s/V \cong A e^{-E_a/RT}$$

where $v_s/V$ is the secondary cross-link concentration, A a constant, R the general gas constant, T the absolute temperature, and $E_a$ is the activation energy of bonding. Thus at temperature of the order of 120°–160° C. these polyurethanes show a decrease in elastic modulus from a room temperature value of 1,800p.s.i. to 5p.s.i.

A primary contribution of the present invention is the provision of articles prepared from thermoplastic polyurethane rubbers which are heat-recoverable and exhibit the property of elastic deformation of extensibility under stress over a wide range of temperatures, i.e., have strength at elevated temperatures.

Accordingly, it is an object of this invention to provide articles prepared from thermoplastic polyurethane rubber capable of changing size and/or shape upon the application of heat and which are useful over a wide range of temperatures.

A further object of the present invention is to provide novel articles prepared from thermoplastic polyurethane rubbers which have been cross-linked, which articles possess dimensional memory characteristics and are capable of returning to an original cross-linked shape upon the application of heat.

Yet another object of this invention if to provide a novel method for the production of heat recoverable articles from polyurethane rubbers which have strength at elevated temperatures.

These an other objects of the present invention will be apparent from the detailed description which follows.

According to the present invention, there is provided a class of thermoplastic polyurethane rubbers which have been cross-linked having over a wide temperature range the property of elastic deformation typical of rubbers which can be made into articles which are capable of changing shape and/or size merely upon the application of heat and recovering to the original or cross-linked shape and size.

As will be more fully explained below, an essential aspect of the present invention is that the thermoplastic polyurethanes of the present invention be cross-linked. As used in the specification, the term "cross-linked" is intended to mean a material having chemical covalent bonds between polymer chains. Since the cross-linked polyurethane rubbers of the present invention will, at temperature below about 160° C., contain not only covalent interchain bonding, but also hydrogen interchain bonding, the material of this invention will sometimes be hereinafter referred to as having "dual" cross-linking. These compositions will also be referred to herein as "cross-linked thermoplastic polyurethanes," i.e., thermoplastic polyurethanes which inherently contain hydrogen bonds which have also been cross-linked by means of additional chemical species. Cross-linking may be accomplished by any suitable method, e.g., irradiation or chemical treatment.

The heat recoverable articles of the present invention are produced by deforming articles comprising cross-linked thermoplastic polyurethanes under conditions such that the articles is substantially permanently deformed and retains a deformed configuration until heated to the recovery temperature of the article. This deformation may be most conveniently carried out while the article is maintained at an elevated temperature, e.g., between about 100° C., and 160° C., depending upon the particular polyurethane used, and then quenching the article at a relatively low-temperature, e.g., 25° C. However, such deformation at elevated temperatures is preferred because, among other things, a lesser degree of deformation is required to produce a given degree of permanent deformation. For example, when identical samples produced according to the present invention were stretched at room temperature and at 100° C., it was found that the former sample required an expansion of 560percent to produce a retained expansion of 100 percent whereas the latter sample required an expansion of about 145percent to produce a retained expansion of 100percent. It is, of course, to be understood that the optimum temperature for deformation will vary from composition to composition and will depend upon the composition of the thermoplastic polyurethane, the degree of cross-linking, etc.

Typical heat-recoverable methods by which polyurethane rubber articles of the present invention may be produced include forming or fabricating into the desired configuration, an article comprising 1. A thermoplastic polyurethane of the type having the following general formula:

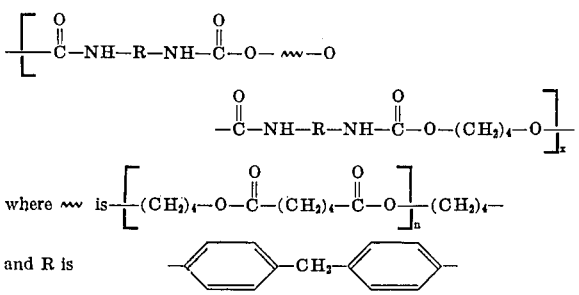

which has been cross-linked by (a) irradiating such a polymer into which has been incorporated a cross-linking monomer such as N,N'-methylene-bis-acrylamide (MBA), and/or N,N'-hexamethylene-bis-maleimide, (b) chemically cross-linked, e.g. with an organic peroxide, alone or together with a cross-linking monomer such as those mentioned above.

2. Heating the material to an elevated temperature, e.g., about 100° C., applying an external force to deform the article to the desired heat-recoverable configuration and then quenching the article at a lower temperature while in the deformed state.

After release of the external force, the article remains in a deformed configuration, not returning to its original cross-linked configuration, as would be the case in ordinary rubber. In this state, the article has the property of heat-recoverability. As used herein, "heat-recoverability" means that an article is dimensionally heat unstable and may be caused to assume a predetermined configuration and a heat stable condition upon the application of heat alone. In addition to having the property of heat-recoverability, these articles have strength at elevated temperatures and will no melt and flow in the manner of conventional uncross-linked thermoplastic polyurethanes.

With reference to the specific details involved in the preparation of the cross-linked thermoplastic polyurethane rubbers of the present invention, the following preferred and/or optional procedures should be mentioned. The thermoplastic polyurethane of the above formula may be mixed with a cross-linking monomer and/or chemical cross-linking agent, e.g., peroxide, preferably on a mill of the conventional type. If a peroxide or other cross-linking agent is added, the polyurethane is, of course, not irradiated. Many other conventional polyurethane additives may be added. Thus, carbon black may be added as a filler. Also, antimony trioxide and polyvinyl chloride may be added as a flame retarding system, and carbodiimides added for increased hydorlytic stability. Such other flame retardants such as those disclosed in my copending applications, now U.S. Pat. Nos. 3,340,226 and 3,354,191 may also be added. Such compositions may then be fabricated into articles of any desired shape, and thereafter cross-linked. The cross-linking may be brought about by exposure of the article to high-energy radiation, such as that from accelerated electrons, X-rays, gamma ray, alpha particles, beta particles, neutrons, etc. A cross-linking monomer is added to the composition and generally the minimum radiation dosage is on the order of 1 megarad. Alternatively, the cross-linking may be brought about by using chemical means, e.g., 2,5-diemthylhexane-2,5-di-t-butyl diperoxide, which after blending with the thermoplastic polyurethane, may be caused to induce cross-linking by heating the blended mixture under pressure to a temperature of 130° C. for 10 hours or 170° C. for 15 minutes, etc. In general, the organic peroxide or other cross-linking agent is employed in an amount from about ½ to about four parts by weight based on the weight of thermoplastic polyurethane.

The cross-linked thermoplastic polyurethane article is then subjected to stress, preferably while at elevated temperature. This elevated temperature is generally above 100° C. and preferably within the range from about 100° C. to about 160° C. The deformed material is then quenched, and preferably the material is maintained under tension during quenching.

The preferred thermoplastic polyurethanes rubber starting materials for use in this invention are sold under the trade names of Estane and Texin and are described chemically above. These materials are supplied in several different forms as indicated in the following table:

TABLE

| Properties | Estane | | | Texin | | |
|---|---|---|---|---|---|---|
| | 5740X1 | 5740X2 | 5740X7 | 480A | 192A | 355D |
| Tensile strength, p.s.i. | 5,840 | 5,000 | 5,840 | 7,000 | 5,700 | 5,000 |
| Elongation, percent | 540 | 720 | 490 | 600 | 640 | 400 |
| 300% modulus, p.s.i. | 1,240 | 420 | 2,800 | 2,000 | 2,260 | 3,400 |

Various tests were performed on the heat-recoverable dual cross-linked polyurethanes of the present invention. The modulus of elasticity at 160°–200° C. was obtained by calculation from plots of stress (p.s.i.) ×(1 +Elongation) vs. Elongation. The ultimate strengths were calculated using the initial cross-sectional area. The gel contents of the polymers were determined by extracting the cross-linked systems with boiling tetrahydrofuran following the procedures outlined by Lyons, B. J., [J. Polymer Sc., Pt. A, 3,p. 777(1965)]. The procedure is basically a modification of the Charlesby-pinner technique [A. Charlesby and S. H. Pinner, Proc. Royal Soc. (London), A249, 367 (1959)]. Heat aging tests were performed by placing strips in a forced draft oven at various temperatures and obtaining the time when the samples flowed under their own weights to over double their initial lengths.

In general, the modulus of elasticity and ultimate strength are very significant in heat-recoverable materials. For the best use of such materials, they must be capable of a significant amount of stretching without splitting at elevated temperatures.

Various memory tests were performed on the heat-recoverable polyurethanes of this invention. These data are an indication of the capacity of the heat-recoverable material to return to its original shape upon heating. These tests were performed using a metal clamp device which served to stretch the polyurethane samples. The samples were dipped in a glycerine bath, either under tension or stretched in the bath and, while under strain, quenched in a water bath at ambient temperature. The polyurethane samples were 0.6 mm. thick strips about 4–5 mm. wide. The bench marks were generally 12.7 mm. apart. Final shrinking was accomplished on the expanded samples several hours and generally overnight after heating, stretching and quenching.

In the various examples which follow, the parts are by weight unless otherwise indicated.

EXAMPLE I

Various polyurethane compositions sold under the trade name Estane were mill mixed on a two-roll laboratory mill at a temperature of 150°–175° C., and the resulting mixtures were pressed into 0.6mm. slabs. The slabs were then subjected to various irradiation doses, using a 1MeV General Electric Resonant Transformer operating at 5–6ma. The modulus of elasticity and ultimate strength at 160° C. and gel content of these cross-linked polyurethanes were measured and the results are tabulated in table 1.

As is shown in table 1, two different cross-linking monomers were incorporated in the thermoplastic polyurethane and irradiated to total does of 5, 10, 20, and 40 megrads. At 160° C., the polyurethane containing no cross-linking monomer requires much higher doses to obtain equivalent modulus than samples containing monomer. It can be seen in the data in table 1 that N,N'-hexamethylene-bis-maleimide and N,N'-methylene-bis-acrylamide are very effective cross-linking monomers.

EXAMPLE II

Several of the cross-linked samples of example I were heat aged at temperatures of 175° and 200° C. to determine the effect of cross-linked density on the heat aging properties. The results of these tabulated in table 2.

The data in table 2 shows that the cross-linked thermoplastic polyurethanes of this invention have vastly improved high temperature dimensional stability over the uncross-linked materials. The cross-linked polyurethane rubbers of this invention are, therefore, generally suitable over a wide range of temperatures.

EXAMPLE III

Several samples of the cross-linked polyurethanes of example I were tested for their ability to retain "locked-in" elongation. This was done by heating strip 6 inch × 1/4 inch × 0.025 inch, which had 1 inch bench marks centrally located on the strips, in a glycerine bath maintained at various temperatures, stretching the samples while at temperature, and, while in the stretched condition, quenching in a cold water bath.

To test the heat recoverable characteristics of these materials, stretched samples were kept at room temperature for

TABLE I

| Estane No. | Monomer used | Monomer level, pts./100 pts./resin | 5 Mrad, 160° C. | | | 10 Mrad, 160° C. | | | 20 Mrad, 160° C. | | | 40 Mrad, 160° C. | | |
|---|---|---|---|---|---|---|---|---|---|---|---|---|---|---|
| | | | Percent gel | Mod., p.s.i. | US, p.s.i. | Percent gel | Mod., p.s.i. | US, p.s.i. | Percent gel | Mod., p.s.i. | US, p.s.i. | Percent gel | Mod., p.s.i. | US, p.s.i. |
| 5740X1 | Nothing | | 0 | 5.0 | 5.9 | 0 | 7.4 | 13 | 25.5 | 12 | 67 | 50.0 | 23 | 53 |
| 5740X1 | MBA [1] | 1 | 0 | 18 | 69 | 46.4 | 19 | 61 | 53.5 | 30 | 113 | 51.7 | 37 | 75 |
| | | 2 | 53.1 | 41 | 129 | 56.5 | 75 | 160 | 64.5 | 74 | 112 | 72.4 | 123 | 122 |
| | | 4 | 58.9 | 81 | 129 | 66.2 | 82 | 156 | 72.9 | 106 | 136 | 76.3 | 161 | 113 |
| 58013 Nat | Nothing | | 0 | 7 | 4 | ≈10 | 23 | | 32.3 | 8 | 62 | 52.8 | 30 | 65 |
| 58013 Nat | MBA [1] | ½ | 52 | 7 | 52 | 55.3 | 21 | 94 | 64.0 | 32 | 68 | | | |
| | | 1 | 57.3 | 13 | 88 | 59.3 | 50 | 118 | 68.0 | 60 | 94 | 65.7 | 66 | 72 |
| | | 2 | 67.6 | 23 | 94 | 71.5 | 60 | 127 | 76.5 | 71 | 142 | 78.1 | 115 | 62 |
| | | 4 | 70.5 | 73 | 143 | 76.9 | 116 | 149 | 77.3 | 137 | 120 | 79.1 | 173 | 106 |
| 58013 Nat | HMBMI [2] | ½ | 26.0 | 29 | 29 | 33.7 | 26.5 | 63 | 47.8 | 41 | 96 | | | |
| | | 1 | 50.6 | 36 | 67 | 55.9 | 51 | 85 | 59.5 | 48 | 155 | | | |
| | | 2 | 67.5 | 58 | 128 | 70.0 | 79 | 112 | 70.7 | 89 | 113 | | | |
| 5740X2 | Nothing | | 0 | 0 | 2.2 | 0 | 8 | 27 | 43.7 | 13.4 | 48 | 58.7 | 25 | 59 |
| 5740X2 | MBA [1] | 1 | 38.4 | 15 | 75 | 51.3 | 38 | 98 | 62.3 | 44 | 94 | 68.8 | 78 | 73 |
| | | 2 | 43.0 | 21 | 101 | 55.2 | 47 | 111 | 67.5 | 75 | 85 | 72.0 | 105 | 74 |
| | | 4 | 50.2 | 39 | 104 | 64.3 | 75 | 154 | 73.4 | 109 | 135 | 76.0 | 164 | 124 |
| 5740X7 | Nothing | | 0 | 15 | 15 | 0 | 27 | 18 | Trace | 29 | 32 | 42.7 | 36 | 51 |
| 5740X7 | MBA [1] | 1 | 56.5 | 42 | 54 | 60.4 | 49 | 60 | 65.4 | 44 | 82 | 69.6 | 62 | 73 |
| | | 2 | 56.3 | 53 | 77 | 64.0 | 45 | 70 | 68.8 | 58 | 63 | 73.0 | 80 | 70 |
| | | 4 | 68.2 | 81 | 90 | 77.0 | 63 | 88 | 78.4 | 97 | 82.0 | 133 | 104 | |

[1] N,N'-methylene bis-acrylamide.
[2] N,N'-hexamethylene bis-maleimide.

TABLE 2

| Estane type | Monomer level (pt./100 pts.) | Dose, mr. | Heat aging observations | |
|---|---|---|---|---|
| | | | 200° C. | 175° C. |
| 5740X1 | None | 0 | Flowed in less than 1 hour | Flowed in less than 1 hour. |
| 5740X1 | do | 20 | do | Slightly elongated at 1 hour, otherwise OK after 700 hours. |
| 5740X1 | do | 40 | do | Elongated some after 52 hours, otherwise OK after 700 hours. |
| 58013 Nat | do | 0 | do | Flowed in less than 1 hour. |
| 58013 Nat | do | 20 | do | Do. |
| 58013 Nat | do | 40 | do | Elongated after 1 hour, flowed after 5 hours. |
| 5740X1 | MBA/2 | 5 | Elongated in less than 1 hour, flowed in 4 hours. | |
| 5740X1 | MBA/2 | 20 | Elongated some between 20–25 hours, otherwise OK after 87 hours. | OK after 700 hours. |
| 5740X1 | MBA/2 | 40 | Elongated some at 41 hours, otherwise OK after 87 hours. [1] | Do. |
| 58013 Nat | MBA/2 | 20 | Flowed in less than 1 hour | Elongated after 5 hours, flowed at 13 hours. |
| 58013 Nat | MBA/2 | 40 | do | Melted at 13 hours. |
| 5740X1 | MBA/4 | 5 | Elongated in 1 hour, otherwise OK after 36 hours. | |
| 5740X1 | MBA/4 | 20 | OK after 87 hours [1] | OK after 700 hours. |
| 5740X1 | MBA/4 | 40 | do [1] | Do. |
| 58013 Nat | MBA/4 | 20 | Elongated at 1 hour, flowed between 1 and 2 hours. | Elongated at 13 hours, otherwise OK after 700 hours. [2] |
| 58013 Nat | MBA/4 | 40 | Elongated at 1 hour, otherwise OK after 87 hours. [1] | Elongated at 37 hours, otherwise OK after 700 hours. [2] |
| 5740X2 | MBA/4 | 40 | Elongated at 18 hours, otherwise OK after 36 hours. | |
| 5740X7 | None | 5 | Flowed in less than 1 hour | |
| 5740X7 | MBA/2 | 5 | Elongated in less than 1 hour, otherwise OK after 36 hours. | |
| 5740X7 | MBA/4 | 5 | do | |

[1] Became brittle somewhere between 87 and 231 hours.
[2] Became "puffy" and "porous" at 350–380 hours.

several days and subsequently placed in a glycerine bath at different temperatures. The recovered dimension was then measured. A comparison of uncross-linked and cross-linked polyurethane sold under the trade name Estane 5740X1 is shown in table 3.

| Dose | 170° C. (p.s.i.) | Ultimate strength (p.s.i.) | 300% modulus (p.s.i.) | Ultimate strength (p.s.i.) | Elongation (percent) |
| --- | --- | --- | --- | --- | --- |
| 10 | 66 | 94 | 3,275 | 7,355 | 407 |
| 20 | 69 | 86 | 4,425 | 7,890 | 383 |

TABLE 3

| | Expansion bath temp., °C. | Stretched elongation, percent (stretched at bath temp.) | Elongation (percent) after quenching in water bath (1 hr. after quick release at 25° C.) | Final recovery (percent) increase in length over original length at— | |
| --- | --- | --- | --- | --- | --- |
| | | | | 110° C. | 160° C. |
| 4 pts. MBA/100 pts. Estane 5740X1 at 20 Mrad | 25 | 560 | 100 | | 2 |
| | 60 | 175 | 100 | | 3 |
| | 80 | 160 | 100 | | 5 |
| | 100 | ------ | 200 | 20 | 5 |
| | 100 | 150 | 100 | | 2 |
| | 120 | 160 | 100 | | 5 |
| | 140 | 175 | 100 | | 12 |
| | 160 | 200 | 100 | | 10 |
| Estane 5740X1 (not crosslinked) | 100 | ------ | 200 | 40 | Flowed |
| | 160 | Flowed | | | |

As is shown in the foregoing data, the polyurethane materials of this invention are able to retain the elongation to a high-degree and yet upon the final recovery, by heating in a 160° glycerin bath, the original length is subsequently regained. As shown in the foregoing data, when the same experiment is performed on the thermoplastic polyurethane, which has not been cross-linked a low-degree of recovery is obtained at a temperature below the flow temperature of this polymer. It is not practicable to obtain a high-degree of recovery since the material flows at temperature necessary to obtain a high-degree of recovery.

EXAMPLE IV

To demonstrate the chemical cross-linking of thermoplastic polyurethanes, two different polyurethanes sold under the trade name Estane were mill mixed at a temperature of 90°–120b$L$ C. with two different organic peroxides and with and without a cross-linking monomer. Following the mill mixing, slabs were cured in a mold at 170° C. for either 8 or 10 minutes, depending upon the specific peroxide used. The modulus of elasticity at 160° C. and percent gel were measured as described previously. Results are tabulated in table 4.

TABLE 4

| Estane type | MBA [1] level (pts./100 pts.) | Peroxide level (1 pt./100 pts.) | Percent gel | Modulus of elasticity and ultimate strength at 160° C. | |
| --- | --- | --- | --- | --- | --- |
| | | | | Mod. (p.s.i.) | US (p.s.i.) |
| 5740X2 | 0 | Varox [2] | 54.8 | 55 | 44 |
| 5740X2 | 4 | do | 85.9 | 208 | 137 |
| 58013 | 0 | Di Cup [3] | 0 | 0 | 0.5 |
| 58013 | 4 | do | 39.3 | 80 | 43 |

[1] N,N'-methylene bis-acrylamide.
[2] Varox, 2, 5-dimethylhexane-2, 5-di-t-butyl diperoxide (the pure liquid), samples cured at 170° C. for 10 minutes.
[3] Di Cup, dicumyl peroxide—samples cured at 170° C. for 8 minutes.

In general, it can be seen that the peroxides cross-link these thermoplastic polyurethanes and higher elastic modulus values are obtained when cross-linking monomers are used.

EXAMPLE V

One hundred pts. of the polyurethane, sold under the trade name Texin 480A were mixed with 4pts. N,N'-methylene-bis-acrylamide at 180° C. on a hot, two-roll mill. The resultant mixture was extruded in a 1½ inch diameter plastic extruder using a rear zone temperature of 160° C., a center zone temperature of 190° C., and a head temperature of 190° C. The tubing had an average wall of 0.016 inch and an average internal diameter of 0.113 inch.

The tubing was then irradiated with high-energy electrons from a 1MeV General Electric Resonant Transformer, using a beam current of 6ma. at 1megavolt. The tubing was irradiated to two different doses, 10 and 20 megarads.

The tubing had the following physical properties:

The 20 Mrad sample was then expanded to an external diameter of 0.250 inch to 0.255 inch. The technique and equipment used was that described in U.S. Pat. No. 3,086,242. The expanded tubing, when heated to 170° C., returned to substantially its original cross-linked dimension.

Samples of the tubing were placed in a forced draft oven at 200° C. The unirradiated material elongated within 5 minutes and flowed within 5 hours. The 10Mrad sample elongated 33percent within 15½hours and 60percent within 120hours. The 20Mrad sample elongated 10percent within 15½hours and 25percent within 120hours.

The use of the heat-recoverable polyurethane of this invention is simple and will be readily understood by those skilled in the art. In general, the polyurethane article is simply put into position for use and heat is applied to it, whereupon the article quickly recovers its original cross-linked configuration. For example, in the production of heat-recoverable rubber tubing, the thermoplastic polyurethane is first compounded and extruded into tubing form. The extruded tubing is then cross-linked. Thereafter, the tubing is subjected to stress while at elevated temperature. This stress may be applied, for example, by the application of pressure upon the inside of the tubing.

The quenching of the tubing while in the stressed state locks the tubing into that state. The tubing therefore has a diameter greater than the original diameter of the extruded and cross-linked tubing, and it will remain in this condition indefinitely at normal storage temperature. The tubing is available for use at any time. For example, the expanded tubing may be placed over an article to be encased. Brief application of heat to the tubing will then cause it to shrink and attempt to return to its original cross-linked dimensions. This recovery permits the tubing to contract tightly around the article which had been inserted therein prior to the application of heat. Therefore, these material are particularly suitable for the encasement of cable wires and the like, as well as for many other purposes as will be apparent to those skilled in the art.

The thermoplastic polyurethane rubbers derive their unique properties from interchain hydrogen bonding (secondary cross-links). When these polymers are covalently cross-linked (primary cross-links) they are thus dually cross-linked. Other "dual" cross-linked elastomeric system exist which show the same unique heat recoverability over wide temperature ranges that the foregoing thermoplastic polyurethanes exhibit. An essential feature of these dual cross-linked elastomers is that they have two types of interchain cross-linking, primary cross-linking and secondary cross-linking. The concentration of the secondary cross-links is markedly decreased by the application of heat resulting in an elastic structure whose strength at elevated temperatures is dependent almost entirely upon the primary cross-links. It is envisioned that the primary cross-links will generally always be heat stable covalent chemicals linkages, while secondary cross-links can be any interaction whose concentration or strength is subject to weakening upon the application of heat. Such secondary cross-linking of secondary chain interaction might be the result of ionic groups showing mutual attraction to a common ion, ionic groups of opposite charge, strong interchain forces exhibited by blocks of glassylike polymer in an otherwise elastomeric material, and weak covalent linkages which are extremely unstable. These dually cross-linked elastomers exhibit elastomeric characteristics over a wide temperature range, and, in addition, exhibit the unique property of heat recoverability. Thus, elastomer articles of various shapes and sizes can be produced which have elastomeric properties over a wide temperature range and are heat recoverable in contrast to the conventional elastomers which exhibit no heat recoverability.

Having fully described the invention, it is intended that it be limited only by the lawful scope of the appended claims.

I claim:

1. A dimensionally heat unstable article capable of changing dimension upon the application of heat alone to assume a predetermined dimension and heat stable condition, said article made by a process comprising cross-linking a thermoplastic polyurethane article by irradiating it to a dose of at least about one megarad, deforming the article at a temperature within the range from about 100° C. to 160° C., and quenching the article in the deformed state.

2. The article of claim 1 wherein quenching occurs at ambient temperature.

3. The article of claim 2 wherein said polyurethane article contains a cross-linking monomer prior to cross-linking.

4. The article of claim 3 wherein said polyurethane contains at least about 0.5 parts by weight per 100 parts polyurethane resin of N,N'-methylene-bis-acrylamide.

5. The article of claim 3 wherein said polyurethane contains at least about 0.5 parts by weight per 100 parts polyurethane resin of N,N'-hexamethylene bis-maleimide.

* * * * *